US012736716B2

(12) United States Patent
Hassan Firoozi et al.

(10) Patent No.: US 12,736,716 B2
(45) Date of Patent: Sep. 15, 2026

(54) METALENS ARRAY AND DISPLAY DEVICE HAVING SAME

(71) Applicant: Chiun Mai Communication Systems, Inc., New Taipei (TW)

(72) Inventors: Amir Hassan Firoozi, New Taipei (TW); Chen-Sheng Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 217 days.

(21) Appl. No.: 18/374,314

(22) Filed: Sep. 28, 2023

(65) Prior Publication Data

US 2024/0241293 A1 Jul. 18, 2024

Related U.S. Application Data

(60) Provisional application No. 63/533,510, filed on Aug. 18, 2023, provisional application No. 63/470,167, (Continued)

(51) Int. Cl.

*G02B 3/00* (2006.01)
*B82Y 20/00* (2011.01)
*G02B 1/00* (2006.01)
*G02B 1/10* (2015.01)
*G02B 27/01* (2006.01)
(Continued)

(52) U.S. Cl.

CPC ............ *G02B 3/0056* (2013.01); *B82Y 20/00* (2013.01); *G02B 1/002* (2013.01); *G02B 1/10* (2013.01); *G02B 3/0043* (2013.01); *G02B 3/0068* (2013.01); *G02B 27/0172* (2013.01); *G02F 1/134318* (2021.01); *G02F 1/13439* (2013.01); *G02F 1/291* (2021.01); *G09G 3/344* (2013.01);
(Continued)

(58) Field of Classification Search

CPC ........ G02B 3/0056; G02B 1/002; G02B 1/10; G02B 3/0043; G02B 3/0068; G02B 27/0172; G02B 2027/0178; G02B 2207/101; B82Y 20/00; G02F 1/134318; G02F 1/13439; G02F 1/291; G02F 2202/36; G02F 1/29; G09G 3/344

See application file for complete search history.

(56) References Cited

U.S. PATENT DOCUMENTS 11,733,552 B2 * 8/2023 Yao ....................... G02F 1/0147 359/288
2018/0216797 A1 8/2018 Khorasaninejad et al.
(Continued)

FOREIGN PATENT DOCUMENTS

CN 113050295 A 6/2021
CN 114280704 A 4/2022
(Continued)

*Primary Examiner* — Charles S Chang
(74) *Attorney, Agent, or Firm* — ScienBiziP, P.C.

(57) ABSTRACT

A metalens array and a display device are provided, the metalens array includes at least one optical transparent substrate; and a plurality of nanostructures arranged over the at least one optical transparent substrate, the plurality of nanostructures defining one or more metalenses, the one or more metalenses arranged in a predetermined arrangement, the at least one optical transparent substrate and the plurality of nanostructures configured to transmit lights.

16 Claims, 18 Drawing Sheets

Related U.S. Application Data filed on May 31, 2023, provisional application No. 63/454,586, filed on Mar. 24, 2023, provisional application No. 63/439,685, filed on Jan. 18, 2023.

(51) Int. Cl.

| | |
|---|---|
| ***G02F 1/1343*** | (2006.01) |
| ***G02F 1/29*** | (2006.01) |
| ***G09G 3/34*** | (2006.01) |

(52) U.S. Cl.

CPC ................ *G02B 2027/0178* (2013.01); *G02B 2207/101* (2013.01); *G02F 2202/36* (2013.01)

(56) References Cited

U.S. PATENT DOCUMENTS

| | | | | |
|---|---|---|---|---|
| 2018/0284428 | A1 | 10/2018 | Guenter | |
| 2021/0405255 | A1* | 12/2021 | Kress | G02B 1/002 |
| 2022/0239883 | A1 | 7/2022 | Wong | |
| 2022/0342232 | A1 | 10/2022 | Hong | |
| 2023/0375841 | A1* | 11/2023 | Kress | G02B 27/0172 |

FOREIGN PATENT DOCUMENTS

| | | | |
|---|---|---|---|
| CN | 115024695 | A | 9/2022 |
| CN | 115047653 | A | 9/2022 |
| CN | 115453670 | A | 12/2022 |
| JP | 2019-086765 | A | 6/2019 |
| JP | 2022-536079 | A | 8/2022 |
| WO | 2022177725 | A1 | 8/2022 |

* cited by examiner 60
30
Image
Objcet
70
50
20
10

60
30
Image
Objcet
50
20
10

30
Image
Objcet
60
40
20
10

Example of fabrication simplicity
Spin-coating
Exposure
Metal deposition
Lift-off
Cladding Cladding
Spin-coating
Exposure
Metal deposition Spin-coating
Exposure
Hard mask
Lift-off
Etching
Hard mask removal
Substrate
Photoresist
Cladding
Hard mask / metal disposition
Dielectric material Unitcell design Pitch design Rectangular Metalens-array (N by M metalenses)

Rectangular Metalens-array (N by M metalenses)

Single Metalens (A single large metalenses)

Single Metalens (A single large metalenses)

Circular Metalens-array (N by M metalenses)

Circular Metalens-array (N by M metalenses)

Single Metalens (A single large metalenses)

Single Metalens (A single large metalenses)

METALENS ARRAY AND DISPLAY DEVICE HAVING SAME

CROSS-REFERENCE TO RELATED APPLICATIONS

This application claims priority to U.S. provisional Application No. 63/439,685 filed on Jan. 18, 2023, U.S. provisional Application No. 63/454,586 filed on Mar. 24, 2023, U.S. provisional Application No. 63/470,167 filed on May 31, 2023, and U.S. provisional Application No. 63/533,510 filed on Aug. 18, 2023 in the United States Patent and Trademark Office (USPTO), the contents of which are incorporated by reference herein.

FIELD

The subject matter herein generally relates to optics technology, and particularly to a metalens array and a display device.

BACKGROUND

Augmented Reality (AR) is a display technology that integrates virtual information with the real world. That is, based on the real world observed by the human eye, the virtual image information projected by an electronic device is integrated. Traditionally head-mounted AR display devices usually include a camera for capturing images within the viewer's field of view, and project virtual image information to a preset position within the viewer's field of view according to the captured image. There is a need for metalens-based systems to filter the unwanted light which severely influences a brightness of the output light without using a polarizer.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

Augmented Reality (AR) is a display technology that integrates virtual information with the real world. That is, based on the real world observed by the human eye, the virtual image information projected by an electronic device is integrated. Traditionally head-mounted AR display devices usually include an image capturing module and a display device for capturing images within the viewer's field of view, and project virtual image information to a preset position within the viewer's field of view according to the captured image.

FIGS. 1A-1F show an exemplary optical system now commonly seen in the market for the application of delivering or displaying augmented-reality (AR) or virtual reality (VR). Human eyes focal length is longer than the distance between typical glasses and eyes, therefore to project an object such that can be easily seen by the user, an optical system is required. The optical system is mainly categorized into two types, diffractive optics (such as diffractive waveguide, slanted gratings, surface relief grating, volume holographic grating, metalenses) and geometrical optics (such as partial mirrors, mirror-array, free-form prism, and beam splitters).

Figure 1A:
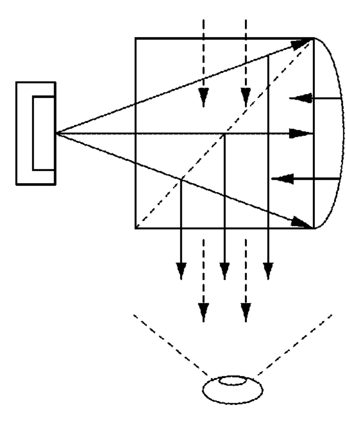
FIGS. 1A-1F illustrate present available optical solutions for building AR/VR devices.
Figure 1B:
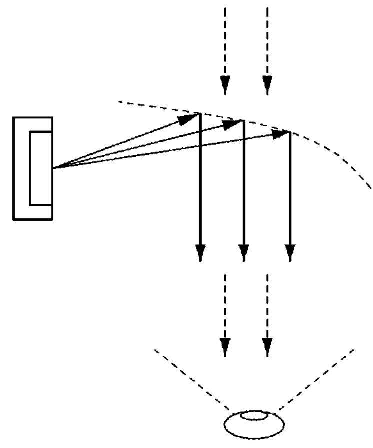
Figure 1C:
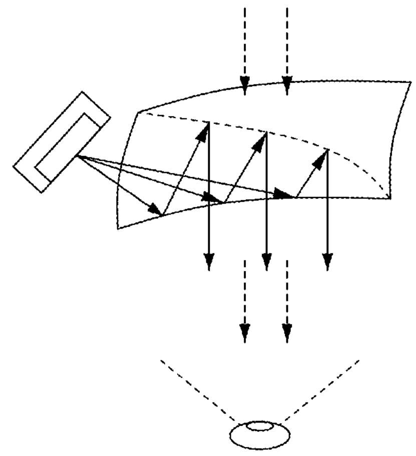
Figure 1D:
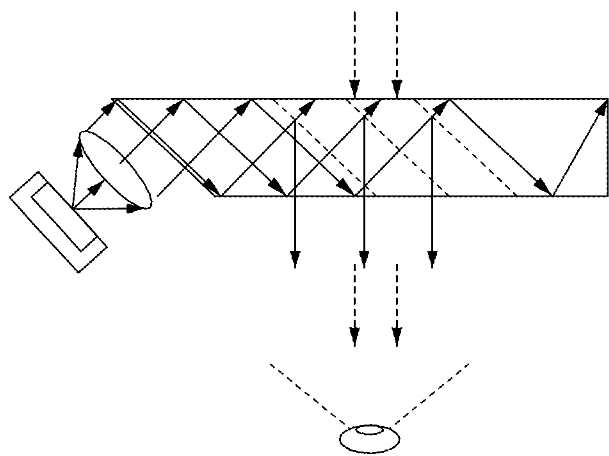
Figure 1E:
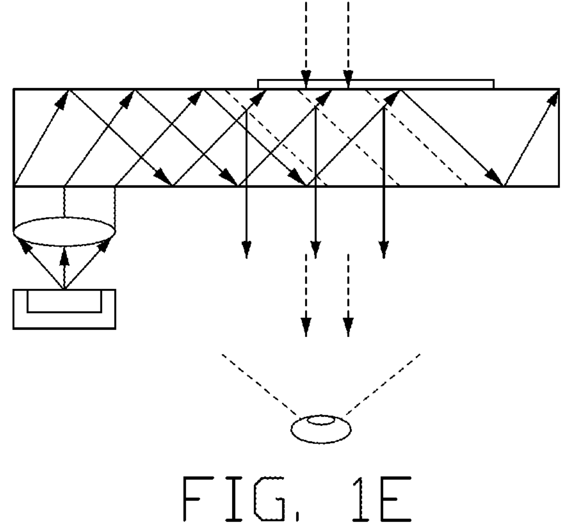
Figure 1F:
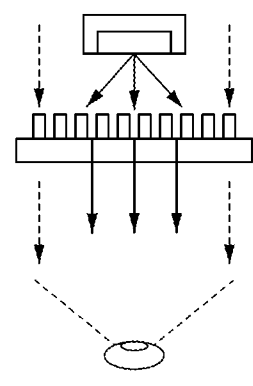

FIGS. 1A-1F illustrate available solutions to address forming an image in front of user's eyes for AR/VR applications. FIG. 1A and FIG. 1B represent partial-mirror based technology. The dash lines shown in FIG. 1A and FIG. 1B represent the partial-mirror structure. One surface of the partial-mirror structure reflects the light projected from the micro display and the other surface of the partial-mirror structure passes through the ambient light to eyes. This configuration addresses the simplest solution to AR/VR glasses with the cost of having larger form-factor. FIG. 1C shows another solution via utilization of free-form prism. However, to cancel the refraction of the ambient light from the main free-form prism a correcting prism is required. FIG. 1D and FIG. 1E show surface relief grating (SRG) and volume holographic grating (VHG) types, respectively. Another configuration which is less bulky and has better see-through transparency has shown in FIG. 1D and FIG. 1E. In this approach due to use of the waveguide, a limited angular range of beams is allowed. Therefore, achievable FOV is inherently restricted. It is noted that the efficiency in all abovementioned approaches are basically less than 10%.

Figures 2A, 2B, 2C:
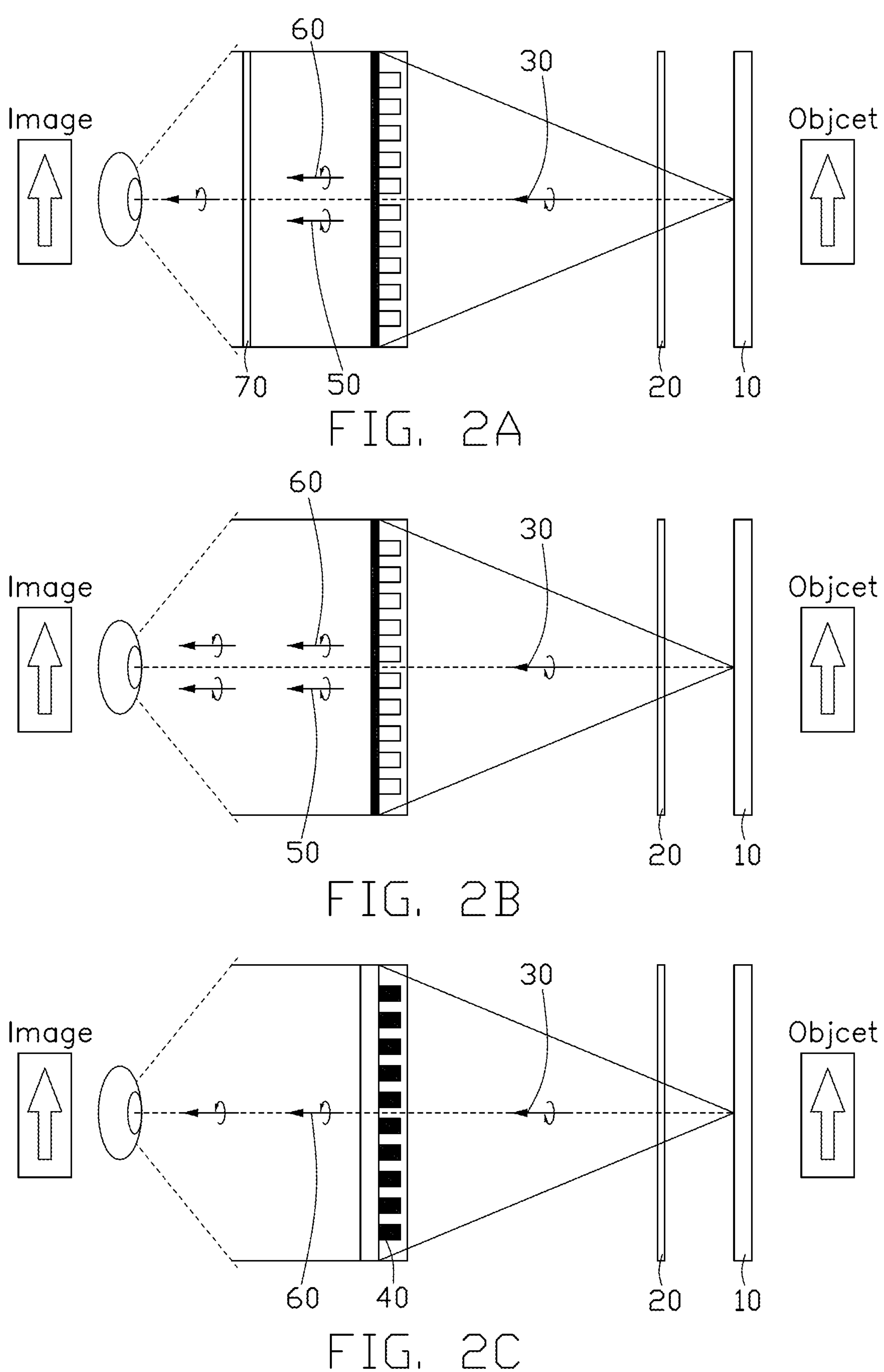
FIGS. 2A-2C illustrate one of the present available optical solutions using dielectric PB-metalenses with and without a second polarizer and metallic PB-metalens.

FIG. 1F and FIGS. 2A-2C exhibit an efficient cutting-edge technology based on so-called metalenses (metasurface) which outperforms all the platforms discussed in FIGS. 1A-1E. As shown in FIG. 2A a micro display illuminates the content which passes through a circularly-polarizer, then, reaches to a metalens whose focal length is adjusted to be exactly same as the gap between the micro display and the metalens (or it can be smaller to form a virtual image for AR applications), next, the metalens will form a collimated light of the content came from the micro display which are now cross-polarized in respect to the first polarizer, and eventually the content can be seen by user. To keep only the focused light a cross polarizer respect to the first polarizer may be used as shown in FIG. 2A. This method filters all the co-polarized light with the cost of scarifying the brightness as a typical polarizer passes less than 50% of an incident light. The need of a second polarizer seems no longer necessary if a metalens is designed based on Pancharatnam-Berry (PB) principle (it is also called Geometrical-Phase). However, due to fabrication difficulties of high aspect dielectric nanostructures, the metalens do not efficiently convert the polarization of an incident light, therefore the final image contains both co-polarized lights which include the out of focused content from the micro display (unwanted information) and the cross-polarized light which comprises of the focused image of the micro display as shown in FIG. 2B. The objective of this work is to minimize the unwanted light using a unique metallic metalens without adding a second polarizer (a cross polarizer in respect with the first polarizer) to filter the unwanted light out which causes a sever loss in the brightness as illustrated in FIG. 2C. The PB-phase metalenses are very promising as they can theoretically support full-color realization of AR/VR devices with the least degradation through different wavelengths. Whereas, most of the available PB-phase metalenses are made of high aspect ratio dielectric materials (such as GaN and TiO2) in AR/VR systems are hindered, which is mainly due to difficult and non-reproducible fabrication of these nano-materials. In other words, the dielectric metalenses cannot fully convert the polarization due to fabrication imperfection and both co-polarized and cross-polarized lights are presented at user sight. It is noted that the fabrication error mainly contributes in form of co-polarized light in dielectric metasurfaces. Therefore it is expected that it greatly influences the efficiency of the device. Since the metalens is designed to only focus the cross-polarized light, the co-polarized light can be seen as the background noise (DC) and it can significantly reduce the contrast of the image. It is noted that the dimensions in schematics of FIGS. 2A-2C are not real and are deliberately drawn in large scale just for the ease of view.

Therefore, there is a need for the metalens-based systems to filter the unwanted light which severely influences the brightness of the output light without using a second polarizer.

FIGS. 2A-2C illustrate one of the present available optical solutions using dielectric PB-metalenses with and without a second polarizer and metallic PB-metalens. Where an element 10 is a micro display, an element 20 is a circular polarizer, elements 30 and 50 are circularly polarized lights with same handedness, an element 60 is a circularly polarized light with cross handedness compared to the elements 30 and 50, and an element 70 is a second polarizer with opposite handedness respect to the first polarizer 20. An element 40 is the proposed metalens.

In FIG. 2A, a lens is spaced apart from the micro display 10, the first polarizer 20 is spaced apart between the micro display 10 and the lens, the lens is also arranged between the first polarizer 20 and the second polarizer 70. The micro display 10 is configured to display real images and illuminates lights, the light is circularly polarized by the first polarizer 20 to form the circularly polarized lights 30, after passing through the lens, circularly polarized lights 50 and circularly polarized lights 60 with cross handedness are formed, further being circularly polarized by the second polarizer 70 to generate images.

In FIG. 2B, the second polarizer 70 is not set comparing to FIG. 2A, the circularly polarized lights 50 and circularly polarized lights 60 with cross handedness directly generate images.

In FIG. 2C, the lens is the metalens array 40 comparing to FIG. 2B, the circularly polarized lights 30 may be circularly polarized by the metalens array 40 to form circularly polarized lights 60 with cross handedness, the circularly polarized lights 60 generate images.

Metasurfaces have received less attention, in particular, in the visible spectrum where the metallic loss (joule loss) is extremely pronounced. Besides, there is a physical limitation for polarization conversion of thin-metallic metalenses up to only 25% for the transmission scheme. However, there is no such restrictions for thick-metallic metalenses, multi-layer metalenses, and reflection scheme. The proposed metalens possesses no physical limitation and depending on how multipoles are balanced and Kerker condition is satisfied; the metalens can perform like its dielectric counterparts.

Figures 3A, 3B, 3C:
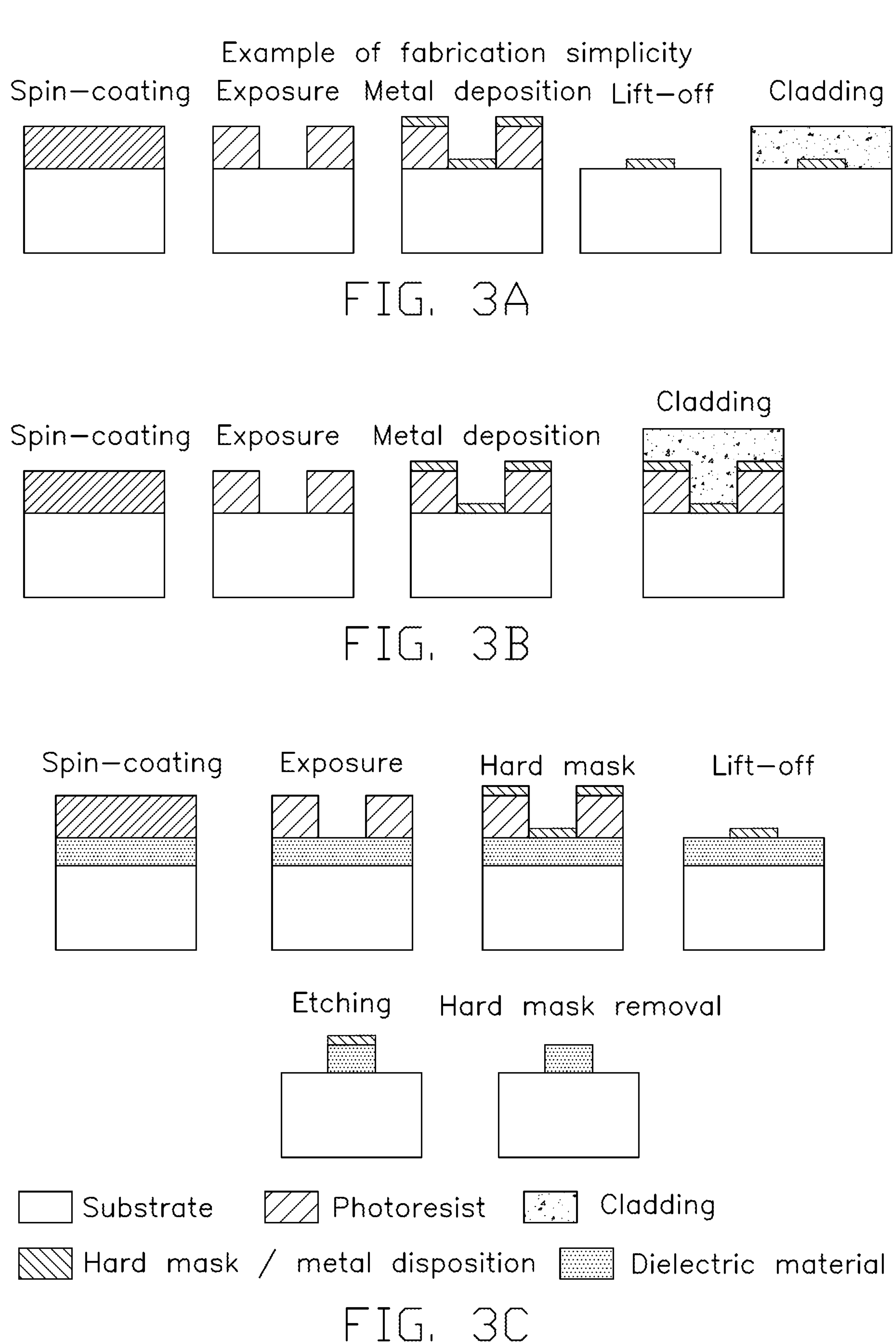
FIGS. 3A-3C illustrate a typical fabrication process for dielectric and metallic metalenses.

To fabricate proposed metallic metalens, mainly four steps are required, and patterned metallic nanostructures can be readily obtained after a direct photoresist lift-off as shown in FIG. 3A. FIG. 3B represents a double-layer metallic nanostructure. The advantage of this design is that the "lift-off" process is not required and only a thin layer of the metal is required over the photoresist/resin. The typical thickness of metal in this method is 15 nm to 50 nm, but not limited to this range. However, to fabricate a dielectric metalens a more complicated process is needed, and the quality of the fabricated nanostructures essentially depends on the quality of dry etching which usually causes a tapering issue as illustrated in FIG. 3C. In other words, the reproducibility of the proposed metalens is no longer an issue and it can be easily mass produced with almost same quality, unlike dielectric metalenses.

Figure 4A:
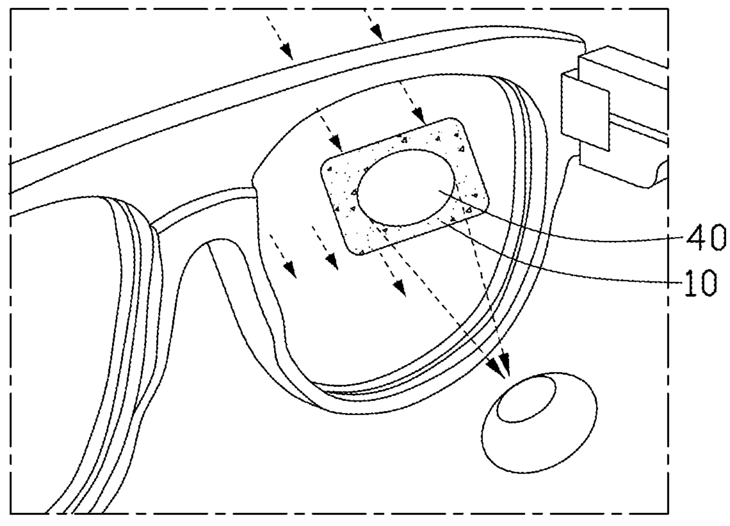
FIGS. 4A-4B illustrate transmission (a) and reflection (b) schemes using the metallic metalens.
Figure 4B:
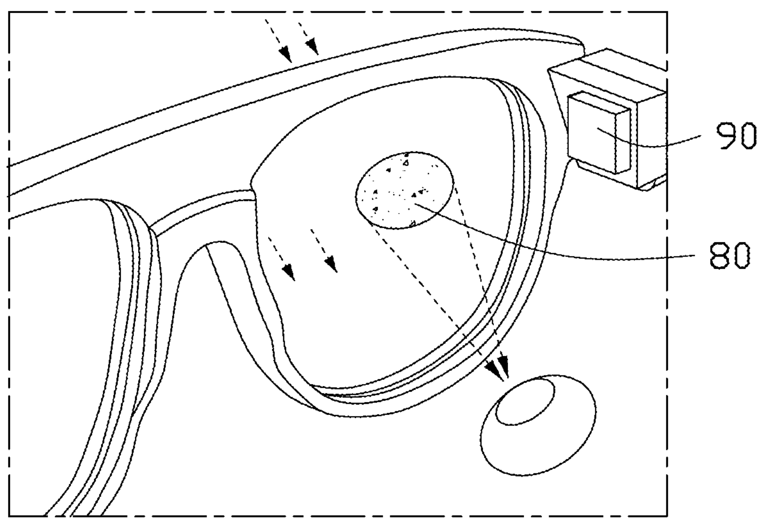

To overcome physical limitation of transmission scheme, a single-layer thick-metallic metasurface (metal thickness greater than 80 nm) or a bi-layer thin-metallic metasurface (metal thickness thinner than 50 nm) can be used. One of the intriguing advantages of the proposed paradigm is that a device within our metalens-based optical system can efficiently adopt to both reflection and transmission schemes as shown in FIGS. 4A and 4B. In one embodiment, the metalens should not be necessarily at the center of the glasses or it can be off the center. In another embodiment, the at least one metalens array 40 is embedded in a frame of the display device, the at least one metalens array 40 is spaced apart from the micro display 10, the at least one metalens array 40 is configured to transmit the lights illuminated by the micro display 10.

Figure 5:
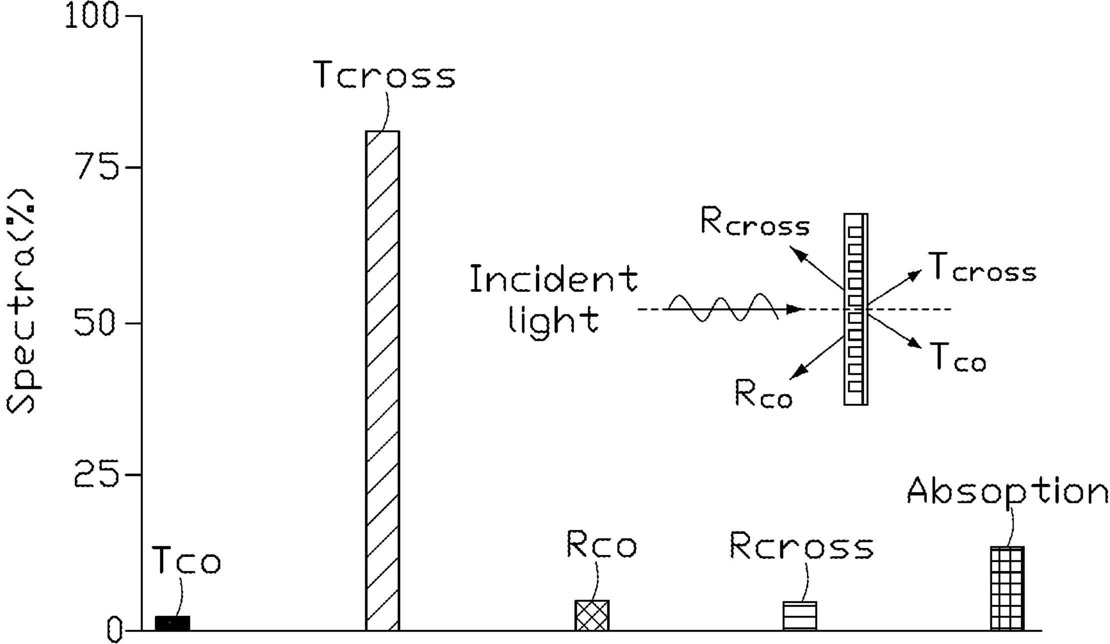
FIG. 5 illustrates transmission/reflection spectra for a transmissive metallic-metasurface in accordance with an embodiment of the present disclosure.

FIG. 5 illustrates one embodiment of a schematic diagram of the highest contrast of our metalens-based optical system compared to prior art. It is shown that the co-polarized transmission (Tco), the cross-polarized transmission (Tcross), the co-polarized reflection (Rco), the cross-polarized reflection (Rcross), and the absorption components for the proposed metasurface. The value of the Tco is greatly smaller than the Tcross and can be considered negligible. The fabrication imperfection emerges as an addition to absorption rather than Tco. Therefore, the focusing-light (the cross-polarized light) will always stay at a much higher ratio in comparison to Tco, which makes the device performs with the highest contrast.

Therefore, a metalens array is disclosed in the disclosure. The metalens array comprises at least one substrate (such as optical transparent substrate) and a plurality of nanostructures arranged over the at least one substrate, the plurality of nanostructures define one or more metalenses, the one or more metalenses are arranged in a predetermined arrangement, the at least one substrate and the plurality of nanostructures configured to transmit lights. In some embodiments, the plurality of nanostructures are composed by a dielectric material or a metallic material, wherein the plurality of nanostructures are composed by a metallic material when the cladding layer is needed.

Figure 6A:
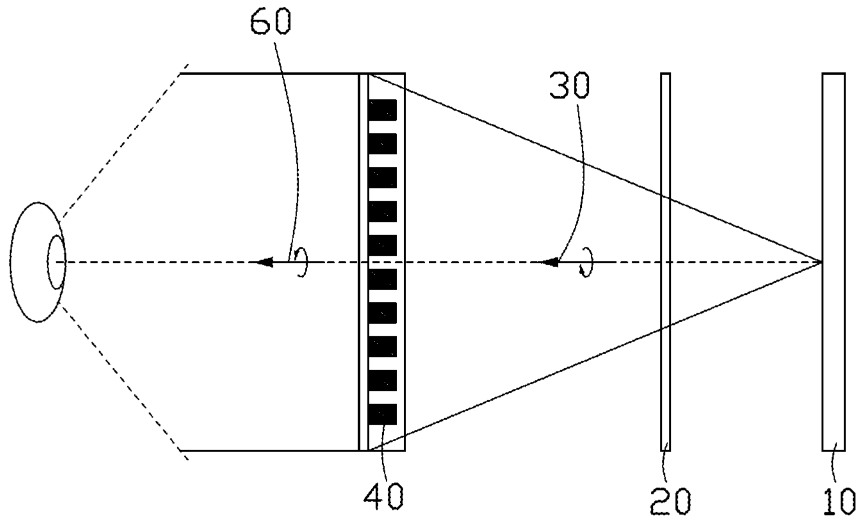
FIGS. 6A-6B illustrate the metalens-based optical system for both transmission and reflection plans, in accordance with an embodiment of the present disclosure.
Figure 6B:
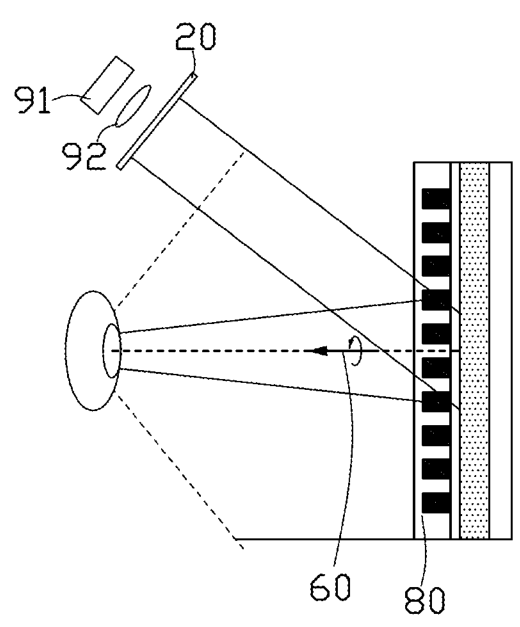

FIG. 6A and FIG. 6B illustrate two embodiments of the metalens-based optical system. As shown in FIG. 6A, the optical system includes a micro display 10, a polarizer module 20, and a metalens array (metalens array may be a form of a metalens module or a metalens array module) 40. A light emanates from the micro display 10 and the micro display 10 displays a real image which is to be shown to the observer. The polarizer module 20 is a circular polarizer to circularly polarize the light illuminated from the micro display 10, according to one embodiment. In some embodiments, the polarizer module 20 could be a liner polarizer or a combination of a liner polarizer and a quarter-wave plate. The metalens array 40 could be embedded in the eyepiece (not shown), which is held by a frame (not shown) with respect to an observer, according to one embodiment. As shown in FIG. 6B, the same scenario applies to the reflection scheme if changing the micro display with a micro projector 91 which has a collimating lens 92 to collimate the displayed light on the metalens 80 then light focuses on user eyes after reflecting from a mirror like a black-reflector.

Figure 6C:
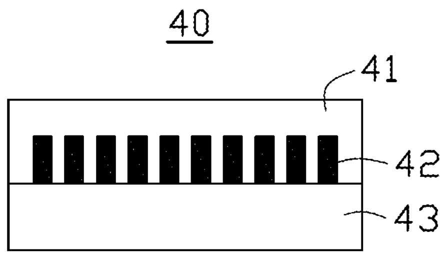
FIG. 6C illustrates the sideview of the metallic metalens array, in accordance with one embodiment of the present disclosure.

FIG. 6C illustrates the transmissive metalens array 40, according to one embodiment. As shown, the metalens array 40 includes a cladding layer 41, a plurality of nanostructures 42, and a substrate 43. The cladding layer 41 could be made from any suitable impedance matching material whose refractive index is comparable with the substrate that can be utilized, such as photoresist. The substrate 43 can be any type of transparent substrate, such as glass made of fused silica ($SiO_2$) or Sapphire. The refractive index of the cladding layer 41 could be close to the refractive index of the substrate 43. The cladding layer 41 can be spin-coated (or deposited) over the patterned nanostructures 42 as the last step of the method operations for creating the metalens array. The plurality of nanostructures 42 are nanosized columns deposited on the substrate 43 and define one or more metalens. Although only one metalens is shown in FIG. 6A, FIG. 6B, FIG. 6C, and FIG. 6D for clarity, it is understood that the metalens array 40 can include any number of metalenses, and the metalenses can be arranged in any desired arrangement, such as a grid or rows and columns of the metalenses. The plurality of nanostructures 42 could be made from a metallic material such as gold (Au) or silver (Ag) of noble metals or Aluminum (Al). These nanostructures can have different anisotropic shapes. In other embodiments, the plurality of nanostructures 42 could be made from a dielectric material. That is, the plurality of nanostructures are composed by a dielectric material or a metallic material. In some embodiments, metallic nanostructures 42 are used when the cladding layer 41 is needed (as shown in at least FIGS. 6C and 6D), however, dielectric nanostructures 42 can be usually used when the cladding layer 41 is not needed. In another embodiment, the metalens array 40 includes at least one optical transparent substrate 43 and a plurality of nanostructures 42 arranged over the at least one optical transparent substrate 43. The metalens array 40 further includes a cladding layer 41, the cladding layer 41 is arranged over the plurality of nanostructures 42 and the at least one optical transparent substrate 43. In some embodiments, a thickness of the reflective layer 85 is greater than a thickness of the spacer layer 84.

Figure 6D:
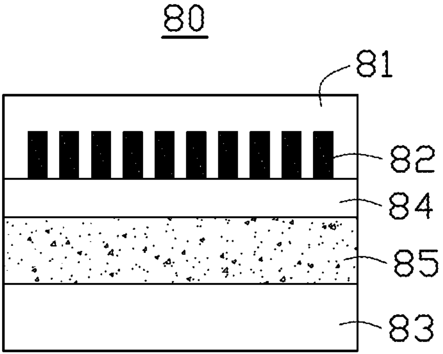
FIG. 6D illustrates the sideview of the metallic metalens array, in accordance with another embodiment of the present disclosure.

FIG. 6D represents the reflective metalens array 80, according to one embodiment. As shown in FIG. 6D, the metalens array 80 includes a cladding layer 81, a plurality of nanostructures 82, a substrate 83, a spacer layer 84, and a thick-reflective layer 85. The substrate 83 can be any type of transparent substrate, such as glass made of fused silica ($SiO_2$) or Sapphire. The spacer layer 84 is a spacer between the plurality of nanostructures 82 and the thick-reflective layer 85. The spacer layer 84 can be made of a thin layer (5 nm~110 nm) of polymer, $SiO_2$, $Al_2O_3$, $HfO_2$, electro-optic dielectric or any oxide and non-conductive materials like dielectrics. The thickness of the spacer layer 84 is labeled as TO. The light passed through the components 81, 82, and 84 will reflect from the surface of the component 85. The thick-reflective 85 used as a back-reflector (mirror) is typically made of thick plain silver, gold and other reflective metals, the thickness is usually 60 nm~200 nm, but it can be any thinner or thicker layer as well. The plurality of nanostructures 82 could be made from a metallic material such as gold (Au) or silver (Ag) of noble metals or Aluminum (Al). In another embodiment, the plurality of nanostructures 82 could be made from a dielectric material. Specially, the plurality of nanostructures 82 are composed by a metallic material when the cladding layer 81 is needed. In another embodiment, the metalens array 40 includes a reflective layer 85 and a spacer layer 84, wherein the spacer layer 84 is arranged between the plurality of nanostructures 82 and the reflective layer 85, the reflective layer 85 is arranged on the at least one optical transparent substrate 83. The spacer layer is made of non-conductive materials, the reflective layer is made of reflective metals.

Figure 7A:
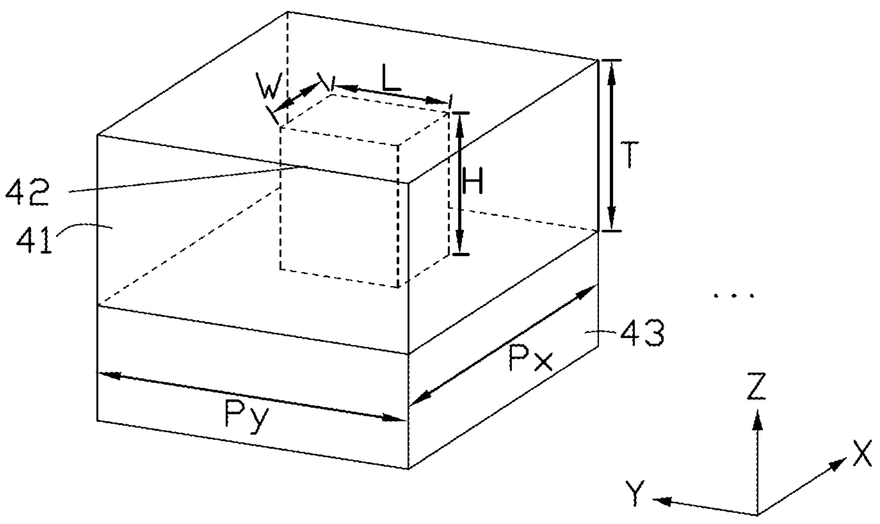
FIG. 7A illustrates one of a plurality of unit-cell structures of the metallic metalens for transmission and reflection schemes, in accordance with an embodiment of the present disclosure.
Figure 7B:
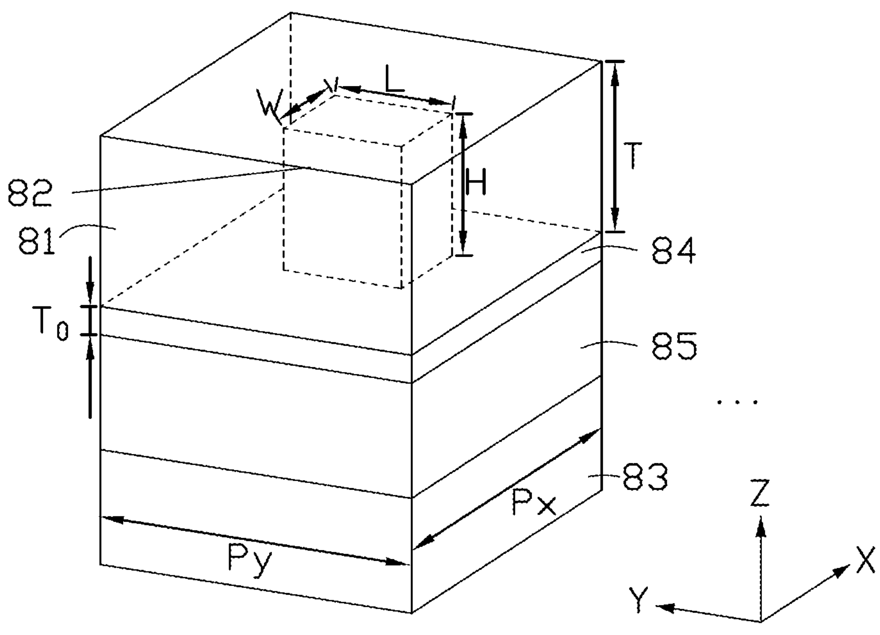
FIG. 7B illustrates one of a plurality of unit-cell structures of the metallic metalens for transmission and reflection schemes, in accordance with another embodiment of the present disclosure.

FIGS. 7A and 7B show two embodiments of a plurality of unit-cell structures of the metalens array 40, 80 in the present disclosure. Each of the metalens array 40, 80 respectively includes the plurality of unit-cell nanostructures. The plurality of unit-cell nanostructures defines one or more metalens. In one embodiment, there should be a plurality of unit cells (i.e., unit-cell nanostructures 42, 82) forming a metalens 45, and there are a plurality of metalenses 45 forming the metalens array 40, 80; or the metalens array 40, 80 is formed by arranging a plurality of metalenses 45, and each metalens is formed by arranging a plurality of unit cells (i.e., unit-cell nanostructures 42, 82). In one embodiment, each unit-cell structure of the metalens array 40 shown in FIG. 7A includes a cladding layer 41, a unit-cell nanostructure 42, and a substrate 43. In one another embodiment, each unit-cell structure of the metalens array 80 shown in FIG. 7B includes a cladding layer 81, a plurality of nanostructures 82, a substrate 83, a spacer layer 84 and a thick-reflective layer 85. The unit-cell nanostructure 42, 82 could have different anisotropic shapes depending on the desired spectrum of light to filter. Each unit-cell nanostructure 42, 82 is designed to respond perfectly only to a single wavelength while have the least interaction with other wavelengths (for example smallest unit-cell nanostructures 42, 82 are for blue color and they should only focus blue light—the ideal case—and not focus green and red light). As the wavelength increases the nanostructure dimensions increases as well. The unit-cell nanostructure 42, 82 can be substantially circular, triangular, square, rectangular, or have an anisotropic shape. The unit-cell nanostructure 42, 82 is rectangular in shape shown in FIG. 7A and FIG. 7B, according to one embodiment. The plurality of unit-cell structures 42, 82 of the metalens array 40, 80 are separated from each other by a pitch size in X direction of Px, which is from 150 nm to 700 nm, and a pitch size in Y direction of Py, which is from 150 nm to 700 nm. The unit-cell nanostructure 42, 82 can have a width of W, which is from 30 nm to 650 nm. The unit-cell nanostructure 42, 82 can have a length of L, which is from 30 nm to 650 nm. The unit-cell nanostructure 42, 82 can have a height of H, which is from 20 nm to 300 nm.

Figure 8A:
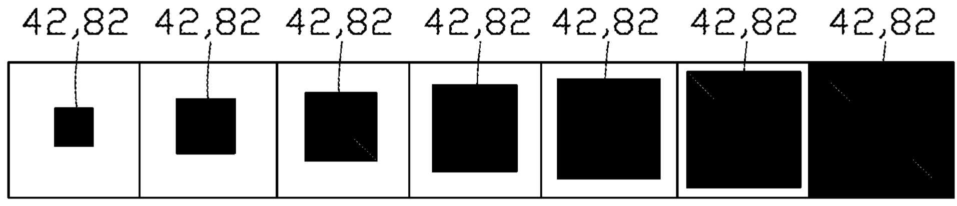
FIGS. 8A-8C illustrate the types of shapes of the unit-cell nanostructures of the metalens from a top view, in accordance with some embodiments of the present disclosure.
Figure 8B:
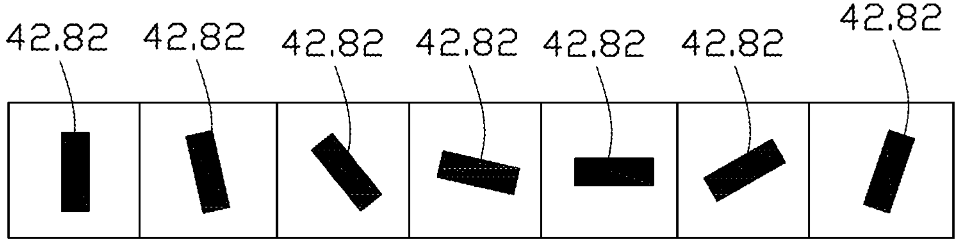
Figure 8C:
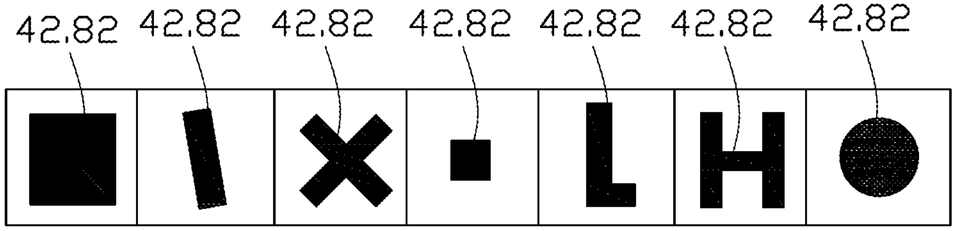

FIGS. 8A-8C illustrate the types of shapes of the unit-cell nanostructure 42, 82 of the metalens from a top view. FIG. 8A illustrates the first type of shape of the unit-cell nanostructure 42, 82, wherein the plurality of unit-cell nanostructures 42, 82 have a fully isotropic shape and can be polarizer independent. For example, the isotropic shapes can be circular shape, square shape with the same size no matter from which side to look at them. FIG. 8B illustrates the second type of shape of the unit-cell nanostructures 42, 82, wherein the plurality of unit-cell nanostructures 42, 82 have a fully anisotropic shape and can be polarizer dependent. For example, the anisotropic shapes can be rectangular shape, "L" shape, "H" shape or any shape with different sizes from different sides to look at them. FIG. 8C illustrates the third type of shape of the unit-cell nanostructure 42, 82, wherein the plurality of unit-cell nanostructures 42, 82 are in shape of a combination of the first type and the second type (i.e., a combination of an isotropic shape and an anisotropic shape), and the plurality of unit-cell nanostructures 42, 82 can be polarizer dependent. Preferably, the polarizer dependent nanostructures 42, 82 are needed to block the unwanted cross-polarized light in the present disclosure, i.e., the plurality of nanostructures 42, 82 have at least one anisotropic shape or a combination of an isotropic shape or an anisotropic shape in order to block the unwanted cross-polarized light. Polarizer dependent metalenses or metalens array 40, 80 (with the polarizer dependent nanostructures 42, 82 having at least one anisotropic shape or a combination of an isotropic shape or an anisotropic shape) have higher contrast compared to the metalenses or metalens array 40, 80 comprised of isotropic nanostructures 42, 82. That is, polarizer dependent scheme (such as the scheme shown in FIGS. 8B and FIC. 8C) is needed in the present disclosure to increase the contrast using transmissive or reflective techniques.

It can be understood that, in order to block the unwanted cross-polarized light, the plurality of nanostructures 42, 82 can have any anisotropic shapes only (or a combination of an isotropic shape and an anisotropic shape). However, all these nanostructure 42, 82 can be arranged to form a regular shape of metalens 45 (such as round lens seen in mobile phones in the current market) or any irregular shape of metalens 45 (such as "L" shape). Similarly, the metalens array 40, 80 does not necessarily need to have a certain shape, instead, the metalens array 40, 80 can have any irregular or anisotropic shapes.

There is a single rule to make a metalens 45 either with isotropic or anisotropic nanostructures and that is the limited number of nanostructures 42, 82 (for example 12 unit-cell nanostructure 42, 82) should fulfill "2*pi" phase change (to have full control of the incoming wave and finally manipulate it). For one embodiment of an isotropic scheme shown in FIG. 8A, this condition is fulfilled only when different sizes are used. In addition, for one embodiment of an anisotropic scheme shown in FIG. 8B, this condition is satisfied when the same nanostructures 42, 82 are used but they are rotated. There is third way which is a combination of isotropic and anisotropic nanostructures together, as shown in FIG. 8C.

There is only one difference between them, a metalens 45 whose nanostructures are made by isotropic nanostructures 42, 82 is "polarizer independent", therefore a polarizer is not needed to make it work. However, for the anisotropic scheme, there is a need to make sure that the display light is circularly polarized (i.e., a circular polarizer is needed to be added in front of the display). However, there may be a need to use different anisotropic shapes for different colors and not only limited to one shape (like rectangular shape of different size for each wavelengths). The third way which is a combination of these two is also polarizer dependent (i.e., a linear or circular polarizer is needed to be added in front of the display depends on the design).

Figure 9A:
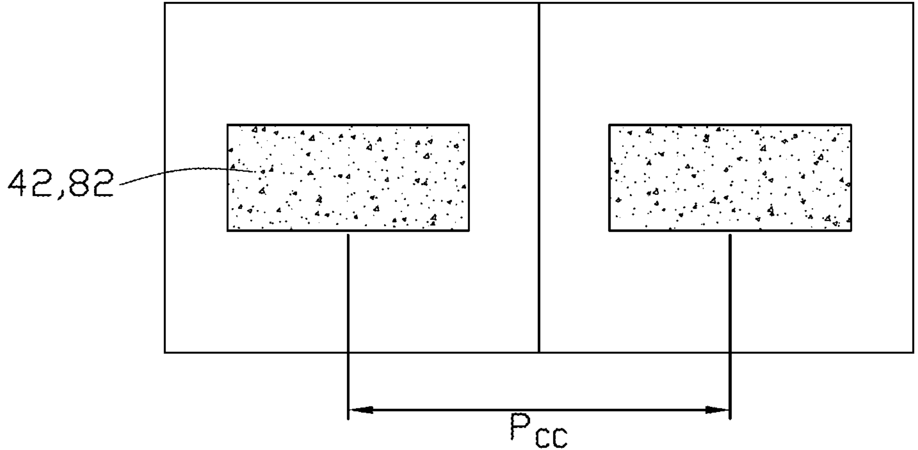
FIGS. 9A-9B illustrate the design of the nanostructure with different pitch definitions, in accordance with some embodiments of the present disclosure.
Figure 9B:
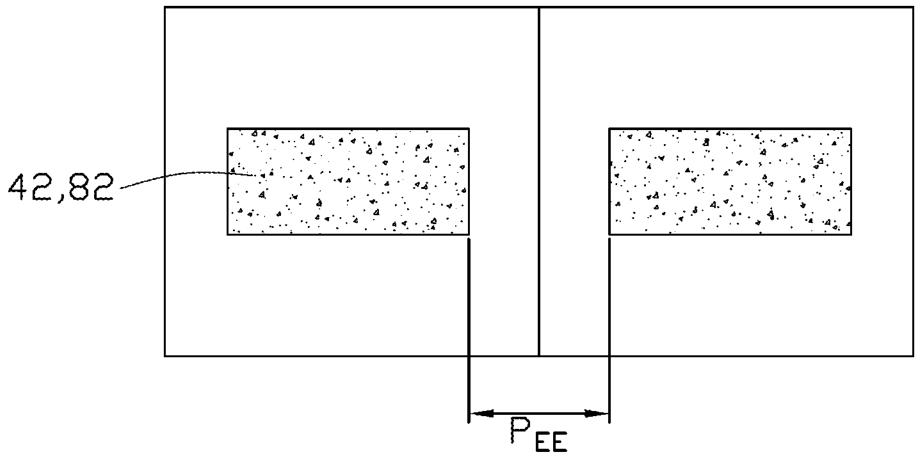

FIGS. 9A-9B shows two different types of the pitch in which a metalens can be designed based on. $P_{CC}$ defines center-to-center pitch, however, $P_{EE}$ dictates edge to edge pitch. The metalens can be designed based on either pitch. Depending on the nano-fabrication machines' minimum feature size, either of these pitches can be picked out to design the metalens array. In another embodiment, the metalens array 40, 80 includes a plurality of unit cells of metalenses, each of the plurality of unit cells of metalenses includes one nanostructure 42, 82 in an anisotropic shape (including a fully anisotropic shape and a combination of an isotropic shape and an anisotropic shape), each of the plurality of unit cells of metalenses is separated from each other by a first predetermined pitch size (such as center-to-center pitch $P_{CC}$ shown in FIG. 9A or edge to edge pitch $P_{EE}$ shown in FIG. 9B).

Figure 10A:
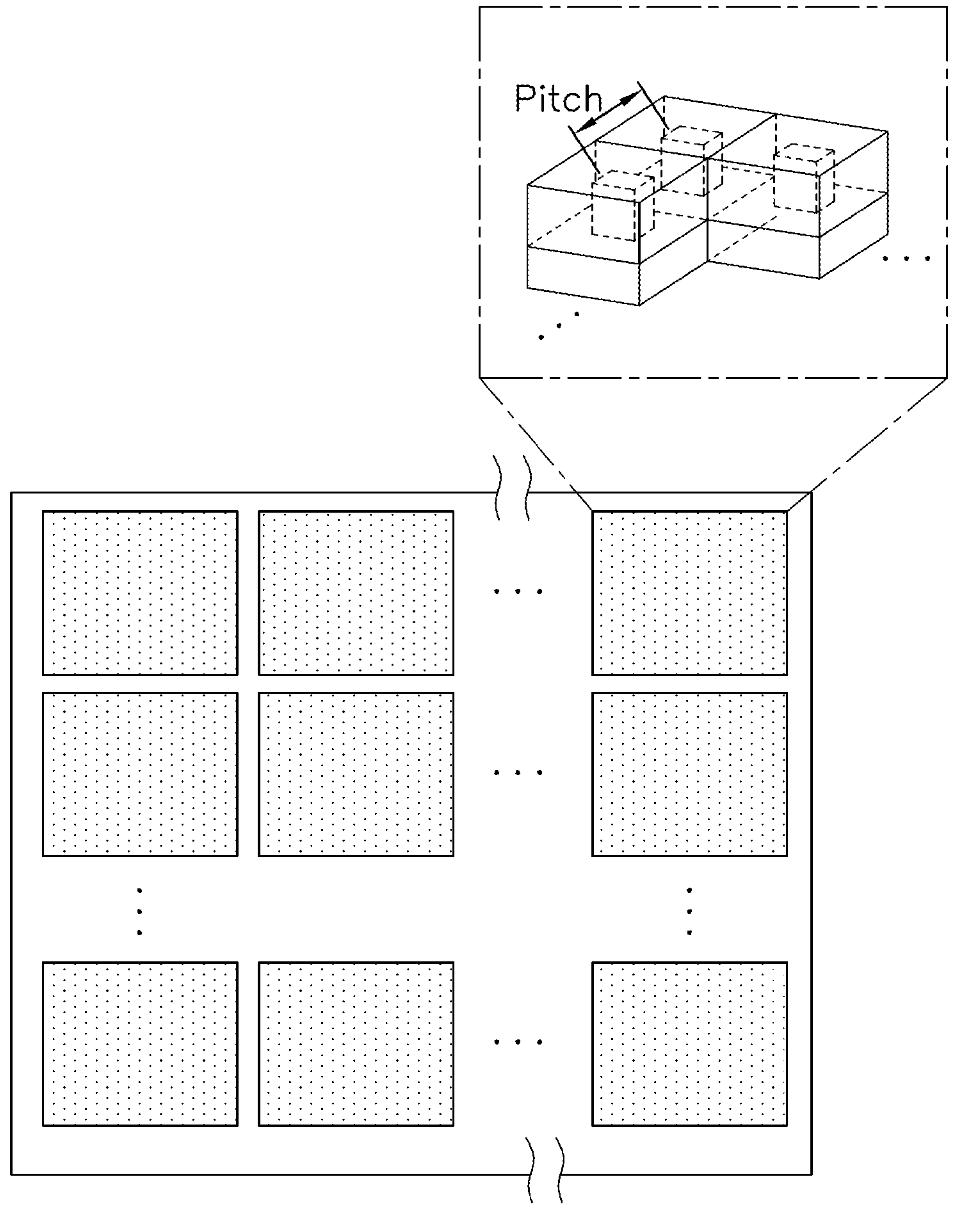
FIGS. 10A-10B, FIGS. 11A-11B, and FIGS. 12A-12D illustrate the plurality of unit-cell structures of the metallic metalens array arranged as one or more metalenses in different configurations, in accordance with some embodiment of the present disclosure.
Figure 10B:
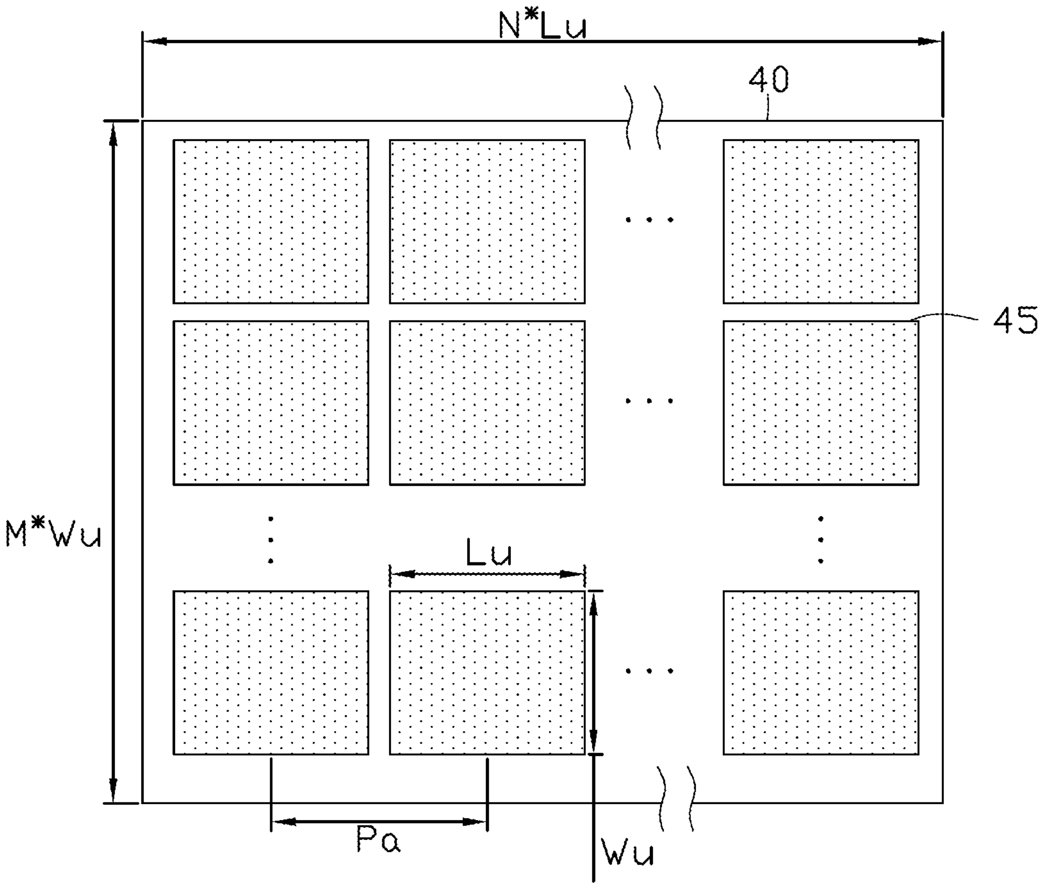
Figure 11A:
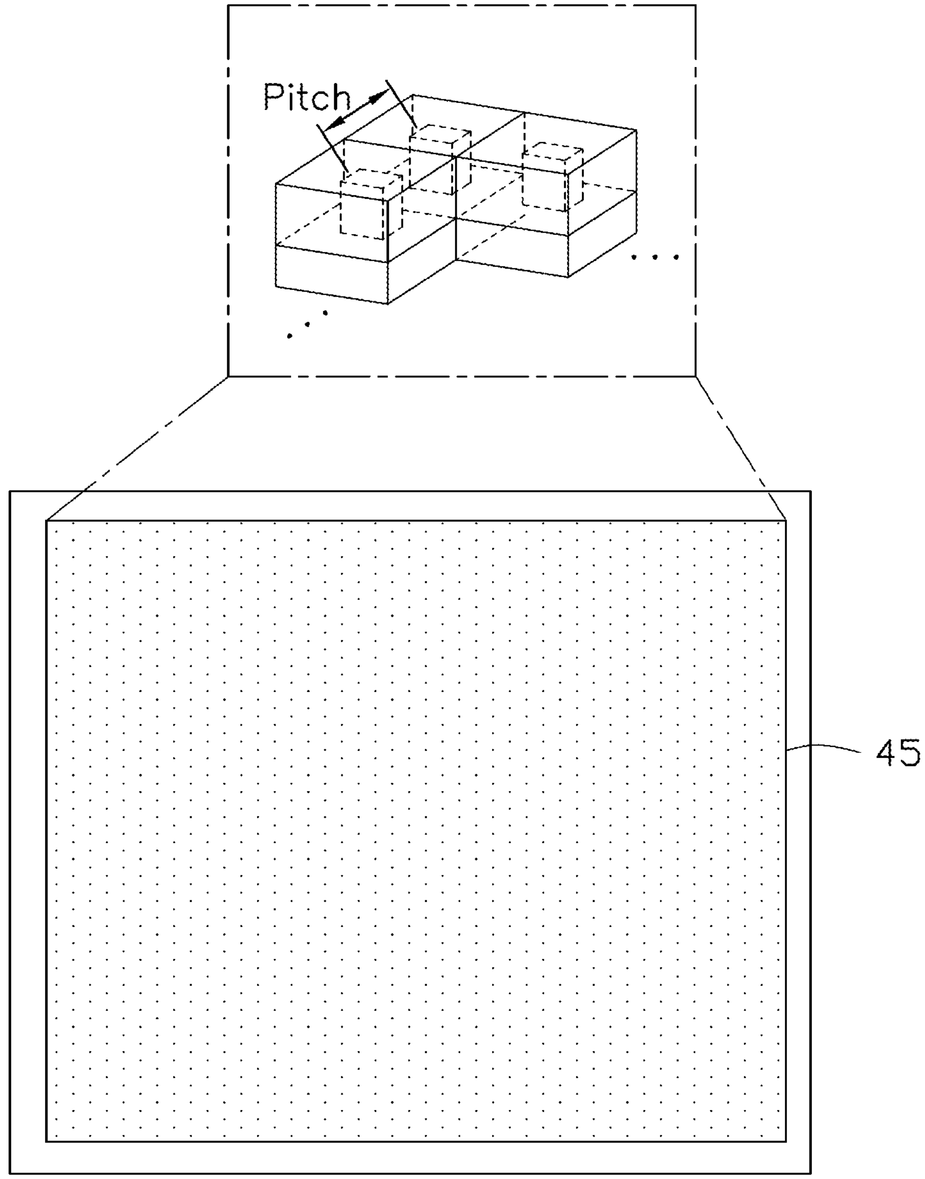
Figure 11B:
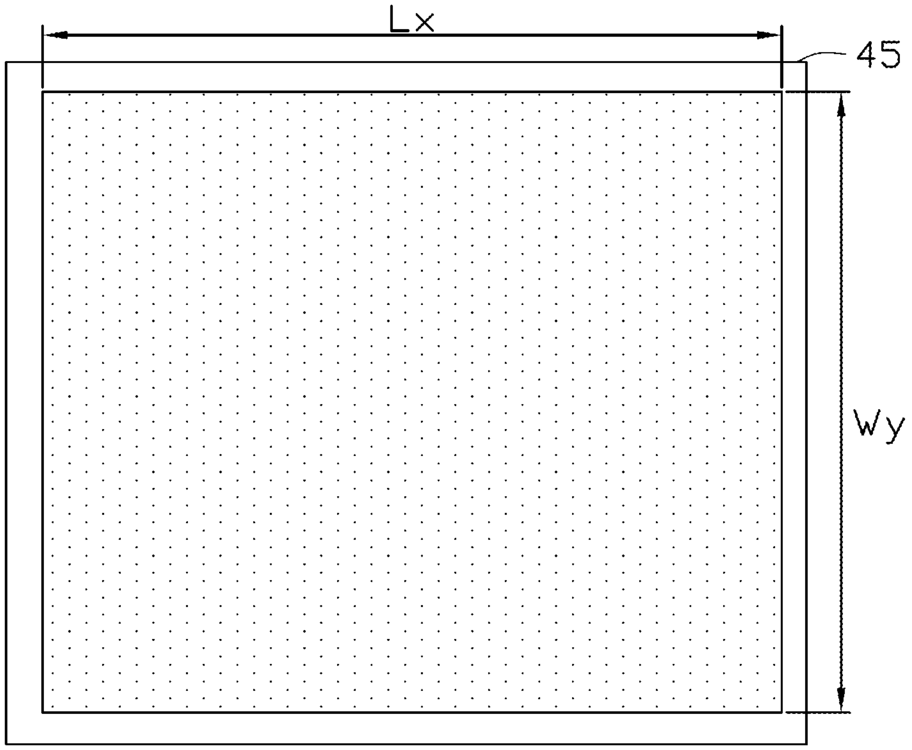

FIGS. 10A-10B and FIGS. 11A-11B respectively show the plurality of unit-cell structures of the metalens array 40, 80 arranged as one or more metalenses in different configurations. The plurality of unit-cell structures could be arranged as a plurality of rectangular-shape metalenses shown in FIG. 10A and FIG. 10B, according to one embodiment. The plurality of unit-cell structures could be arranged as one rectangular-shape metalens shown in FIG. 11A and FIG. 11B, according to one embodiment. In another embodiment, the metalens array 40 includes at least one optical transparent substrate 43 and a plurality of nanostructures 42 arranged over the at least one optical transparent substrate 43. The plurality of nanostructures 42 defines one or more metalens (such as a plurality of metalenses 45 as shown in FIG. 10B, and only one metalens 45 as shown in FIG. 11A and FIG. 11B), the one or more metalenses are arranged in a predetermined arrangement, the at least one optical transparent substrate and the plurality of nanostructures 42 are configured to transmit lights. The plurality of nanostructures 42 have at least one anisotropic shape or a combination of an isotropic shape or an anisotropic shape.

The plurality of unit-cell nanostructures 42, 82 could be arranged as a plurality of rectangular-shaped metalenses 45 shown in FIG. 10A and FIG. 10B, according to one embodiment. Each rectangular-shaped metalens 45 can have a width of Wu and a length of Lu, the metalens arrays 40, 80 can have a width of M*Wu and a length of N*Lu, and rectangular-shaped metalens 45 can be separated from each other by a pitch size in X direction of Px and a pitch size in Y direction of Py. That is, in another embodiment, the plurality of nanostructures 42, 82 are arranged in a plurality of metalenses 45. The plurality of metalenses 45 are separated from each other by a second predetermined pitch size Pa (such as a combination of a pitch size in X direction of Px and a pitch size in Y direction of Py). The numbers (N) of the rectangular-shaped metalenses 45 in X direction could be equal to or different from the numbers (M) of the rectangular-shape metalenses 45 in Y direction, and the size of Px could be equal to or different from the size of Py. In some embodiment, the metalens may include three or more different unit cells for different colors, such as for each color may need different pitches, widths, lengths, but in same height for all colors. In another embodiment, the metalens may include same unit cells (such as with same pitch) for all colors (such as with different widths and lengths, but in the same height).

The plurality of unit-cell nanostructures 42, 82 could be arranged as a single rectangular-shaped metalens 45 shown in FIG. 11A and FIG. 11B, according to one embodiment. The single rectangular-shaped metalens 45 can have a width of Wu and a length of Lu, and the metalens array 40, 80 can have a width of Wy and a length of Lx. The size of Lx could be equal to or different from the size of Wy.

Figure 12A:
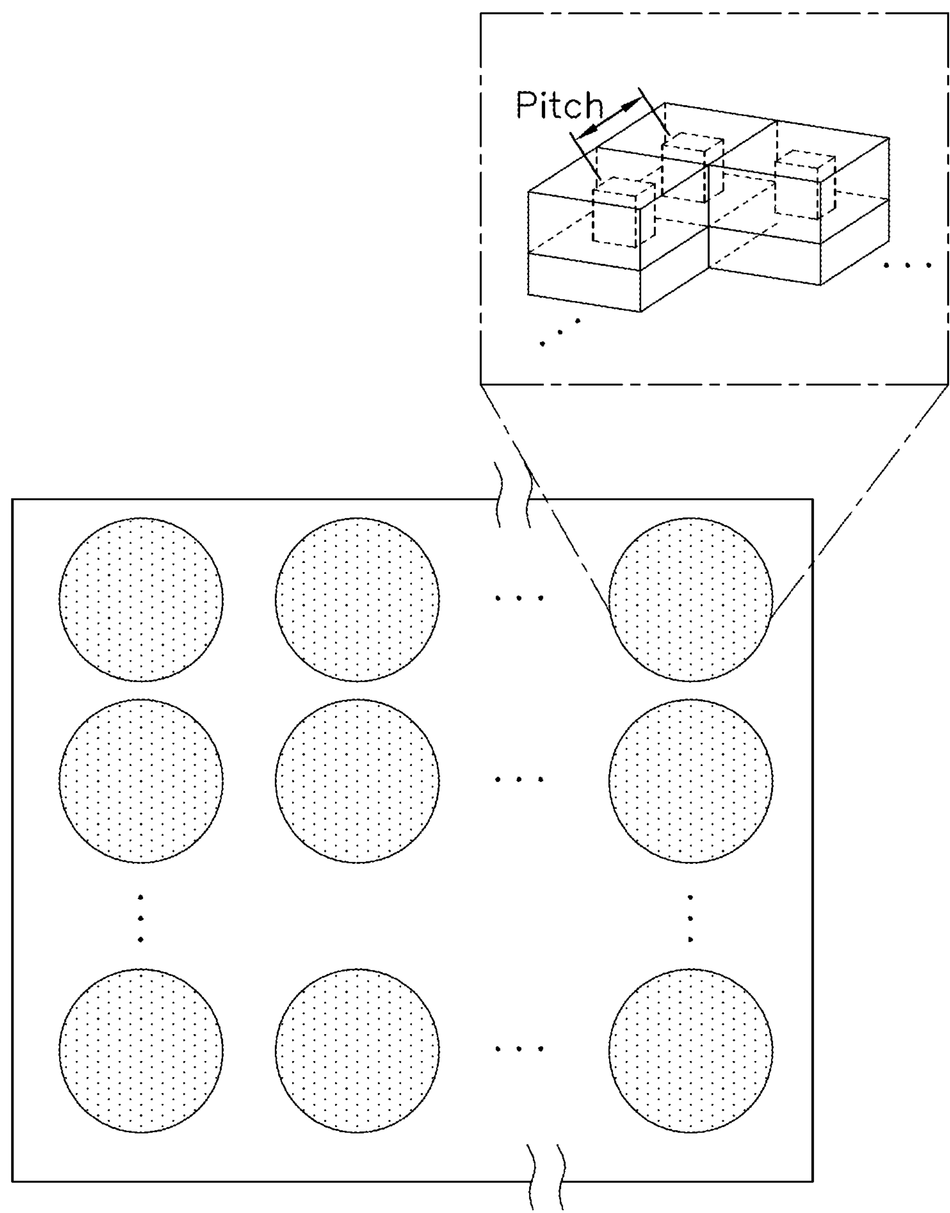
Figure 12B:
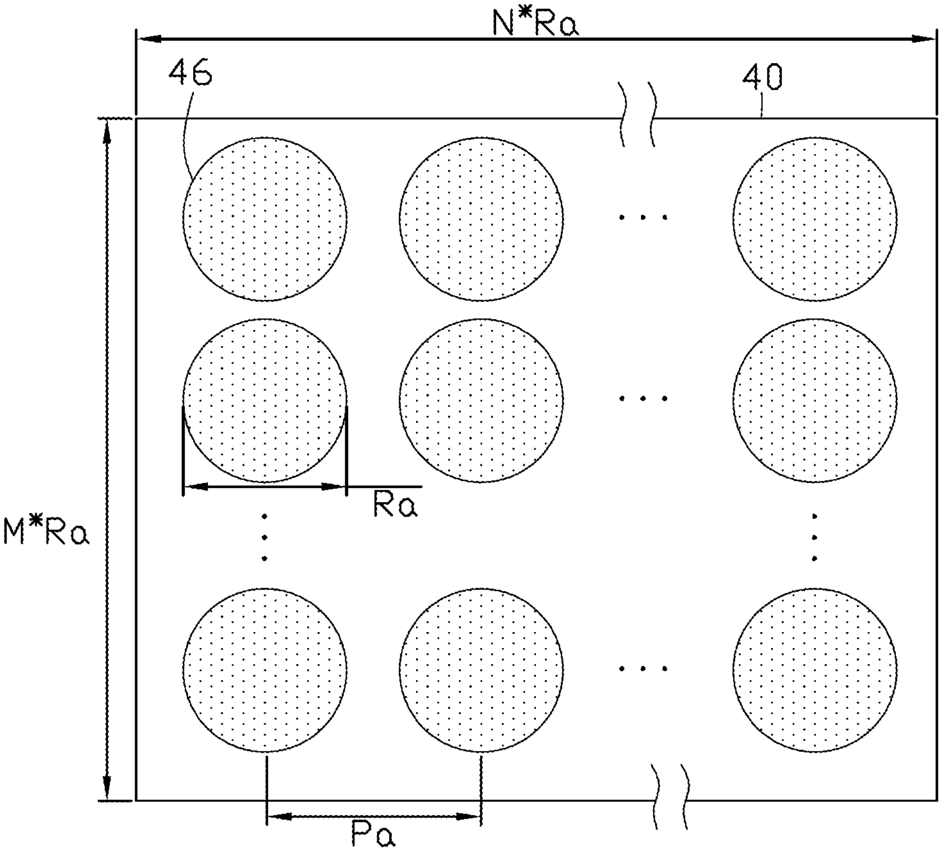

The plurality of unit-cell nanostructures 42, 82 could be arranged as a plurality of round-shape metalenses 46 shown in FIGS. 12A and 12B, according to one embodiment. Each round-shape metalens 46 can have a diameter of Ra, which is from 30 nm to 650 nm. The metalens array 40, 80 can have a width of M*Ra and a length of N*Ra, and round-type metalenses 46 can be separated from each other by a pitch size in X direction of Px and a pitch size in Y direction of Py. That is, in another embodiment, the plurality of nanostructures 42, 82 are arranged in a plurality of metalenses 46. The plurality of metalenses 46 are separated from each other by a second predetermined pitch size Pa (such as a combination of a pitch size in X direction of Px and a pitch size in Y direction of Py). The size of Px could be a distance between a center of one round-shape metalenses 46 and a center of other round-shape metalenses 46 adjacent to the said one round-shape metalenses 46 in X direction. The size of Py could be a distance between a center of one round-shape metalens arrays 46 and a center of other round-shape metalenses 46 adjacent to the said one round-shape metalenses 46 in Y direction. The numbers (N) of the rectangular-shape metalenses 46 in X direction could be equal to or different from the numbers (M) of the rectangular-shape metalenses 46 in Y direction, and the size of Px could be equal to or different from the size of Py.

Figure 12C:
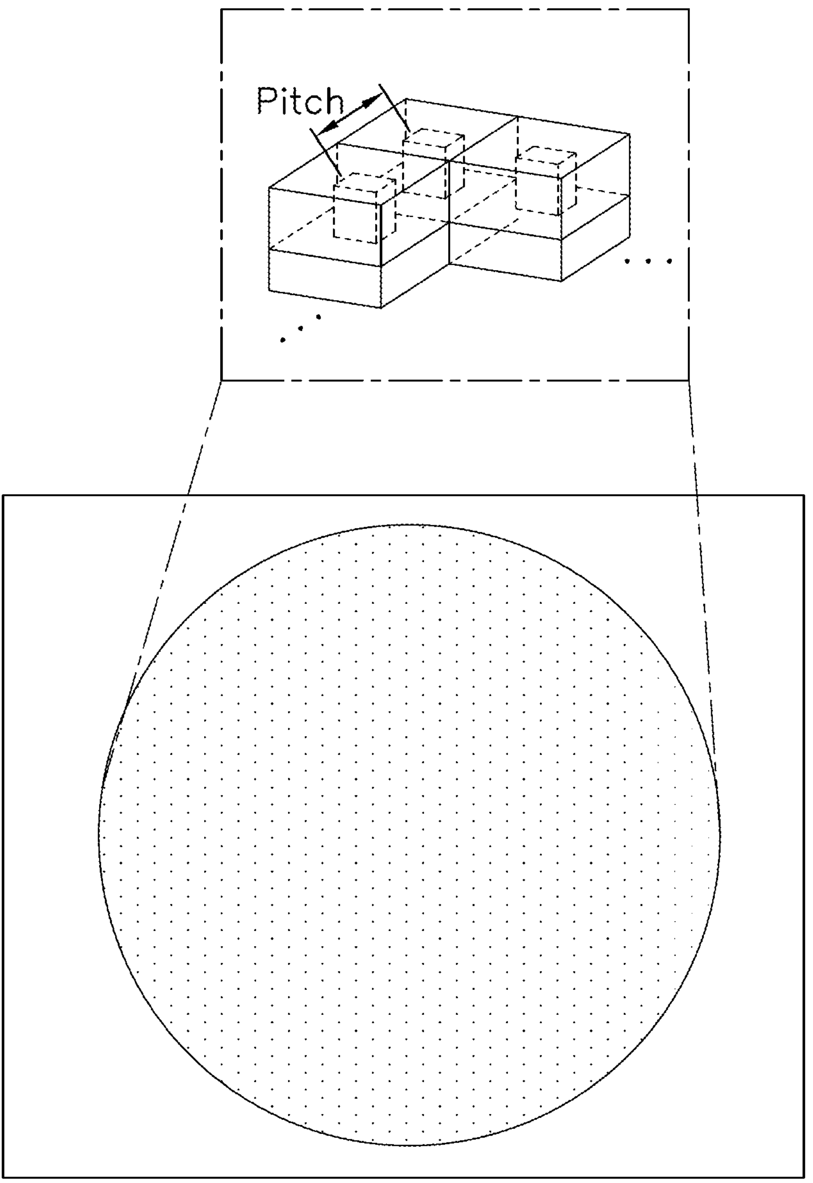
Figure 12D:
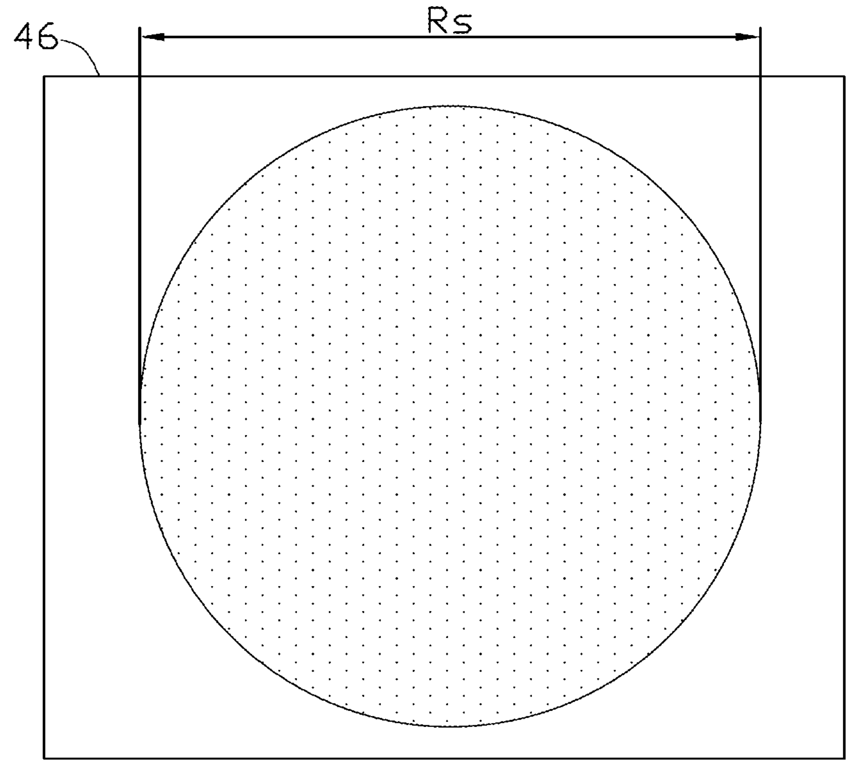

The plurality of unit-cell nanostructures 42, 82 could be arranged as a single round-shape metalenses shown in FIGS. 12C and 12D, according to one embodiment. The single round-shape metalens can have a diameter of Ra, and the metalens array 40 can have a width of Wy and a length of Lx. The size of Lx could be equal to or different from the size of Wy.

Referring to FIG. 6A, the light illuminates from the micro display 10 is circularly polarized by the circular polarizer 20. A circularly polarized light 30 from the circular polarizer 20 will strike the metalens array 40 and transmit, and an output light including a co-polarized light 50 and a cross-polarized light 60 will be transmitted by the metalens array 40. The cross-polarized light 60 as focusing light will be seen by the observer while the co-polarized light as non-focusing light is eliminated by the metalens array 40.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A metalens array comprising:

at least one optical transparent substrate;

a plurality of nanostructures arranged over the at least one optical transparent substrate, the plurality of nanostructures defining one or more metalenses, the one or more metalenses arranged in a predetermined arrangement, the at least one optical transparent substrate and the plurality of nanostructures configured to transmit lights, the plurality of nanostructures is a double-layer metallic nanostructure comprising a photoresist layer on the at least one optical transparent substrate and a metal layer on the photoresist layer;

a reflective layer arranged on the at least one optical transparent substrate, wherein the reflective layer is plain and made of reflective metals; and a spacer layer arranged between the plurality of nanostructures and the reflective layer, wherein the spacer layer is plain and non-patterned and made of non-conductive materials.

2. The metalens array according to claim 1, wherein the plurality of nanostructures are composed by a dielectric material.

3. The metalens array according to claim 2, wherein the metalens array comprises a plurality of unit cells of metalenses, each of the plurality of unit cells of metalenses comprises one nanostructure in an anisotropic shape, each of the plurality of unit cells of metalenses is separated from each other by a first predetermined pitch size.

4. The metalens array according to claim 3, wherein the plurality of unit cells of metalenses are arranged as a single rectangular-shape metallic metalens.

5. The metalens array according to claim 3, wherein the plurality of rectangular-shape metalenses are separated from each other by a second predetermined pitch size.

6. The metalens array according to claim 1, wherein the plurality of nanostructures are composed by a metallic material.

7. The metalens array according to claim 6, further comprising a cladding layer, wherein the cladding layer is arranged over the plurality of nanostructures and the at least one optical transparent substrate.

8. The metalens array according to claim 1, wherein the plurality of nanostructures are arranged in a plurality of rectangular-shape metalenses.

9. A display device comprising:

a micro display configured to display real images and illuminate lights;

at least one metalens array embedded in a frame of the display device, the at least one metalens array spaced apart from the micro display, the at least one metalens array configured to transmit the lights illuminated by the micro display, the at least one metalens array comprising:

at least one optical transparent substrate;

a plurality of nanostructures arranged over the at least one optical transparent substrate, the plurality of nanostructures defining one or more metalenses, the one or more metalenses arranged in a predetermined arrangement, the at least one optical transparent substrate and the plurality of nanostructures configured to transmit lights, the plurality of nanostructures is a double-layer metallic nanostructure comprising a photoresist layer on the at least one optical transparent substrate and a metal layer on the photoresist layer;

a reflective layer arranged on the at least one optical transparent substrate, wherein the reflective layer is plain and made of reflective metals; and a spacer layer arranged between the plurality of nanostructures and the reflective layer, wherein the spacer layer is plain and non-patterned and made of non-conductive materials.

10. The display device according to claim 9, further comprising a polarizer module, wherein the polarizer module is arranged between the micro display and the at least one metalens array, the polarizer module is configured to circularly polarize the lights illuminated by the micro display.

11. The display device according to claim 9, wherein the plurality of nanostructures are composed by a dielectric material or a metallic material.

12. The display device according to claim 11, wherein the metalens array further comprises a cladding layer, the cladding layer is arranged over the plurality of nanostructures and the at least one optical transparent substrate.

13. The display device according to claim 11, wherein the metalens array comprises a plurality of unit cells of metalenses, each of the plurality of unit cells of metalenses comprises one nanostructure in an anisotropic shape, each of the plurality of unit cells of metalenses is separated from each other by a first predetermined pitch size.

14. The display device according to claim 13, wherein the plurality of unit cells of metalenses are arranged as a single rectangular-shape metalens.

15. The display device according to claim 13, wherein the plurality of rectangular-shape metalenses are separated from each other by a second predetermined pitch size.

16. The display device according to claim 9, wherein the plurality of nanostructures are arranged in a plurality of rectangular-shape metalenses.

* * * * *